US008523673B1

(12) United States Patent
Boyd et al.

(10) Patent No.: US 8,523,673 B1
(45) Date of Patent: Sep. 3, 2013

(54) VOCALLY INTERACTIVE VIDEO GAME MECHANISM FOR DISPLAYING RECORDED PHYSICAL CHARACTERISTICS OF A PLAYER IN A VIRTUAL WORLD AND IN A PHYSICAL GAME SPACE VIA ONE OR MORE HOLOGRAPHIC IMAGES

(76) Inventors: Markeith Boyd, Fitchburg, WI (US); Stephen Brathwaite, Brooklyn, NY (US)

( * ) Notice: Subject to any disclaimer, the term of this patent is extended or adjusted under 35 U.S.C. 154(b) by 0 days.

(21) Appl. No.: 12/967,269

(22) Filed: Dec. 14, 2010

Related U.S. Application Data

(60) Provisional application No. 61/284,134, filed on Dec. 14, 2009.

(51) Int. Cl.
*A63F 9/24* (2006.01)
*A63F 13/00* (2006.01)

(52) U.S. Cl.
USPC ..................... 463/34; 463/1; 463/31; 463/32

(58) Field of Classification Search
USPC ...................................... 463/36–43, 1, 30–34
See application file for complete search history.

(56) References Cited

U.S. PATENT DOCUMENTS

| | | | |
|---|---|---|---|
| 4,421,317 A * | 12/1983 | Hector et al. | 463/32 |
| 7,233,904 B2 * | 6/2007 | Luisi | 704/275 |
| 7,491,123 B2 | 2/2009 | Smith | |
| 7,512,656 B2 | 3/2009 | Tsuchiya | |
| 7,775,883 B2 * | 8/2010 | Smoot et al. | 463/36 |
| 7,785,197 B2 | 8/2010 | Smith | |
| 8,096,876 B2 * | 1/2012 | Beaudry | 463/31 |
| 2004/0192430 A1 * | 9/2004 | Burak et al. | 463/20 |
| 2005/0277467 A1 * | 12/2005 | Karabin et al. | 463/31 |
| 2006/0264258 A1 * | 11/2006 | Zalewski et al. | 463/36 |
| 2010/0261527 A1 * | 10/2010 | Steiner et al. | 463/36 |
| 2011/0263326 A1 * | 10/2011 | Gagner et al. | 463/34 |

* cited by examiner

*Primary Examiner* — Milap Shah
(74) *Attorney, Agent, or Firm* — Mark Levy; Hinman, Howard & Kattell, LLP

(57) ABSTRACT

The present invention is a vocally interactive video gaming mechanism. A microphone is connected to a video game system for allowing a player in a room to communicate by voice within the game. A video recording device is also provided for scanning and recording the physical characteristics of the player to be projected into the gaming world. A holographic projector projects the recorded physical characteristics of the player into the room in which the player is engaged in the game. Messages can be received from a telephone, a cell phone, a personal digital assistant, or a digital processor. Game progress can be halted in order for the player to answer or respond or to ignore the message. Movements of the player are tracked and converted into movements of the holographic projection of the player in real time. Voice recognition software enables translation of speech from one language into another language.

5 Claims, 3 Drawing Sheets

VOCALLY INTERACTIVE VIDEO GAME MECHANISM FOR DISPLAYING RECORDED PHYSICAL CHARACTERISTICS OF A PLAYER IN A VIRTUAL WORLD AND IN A PHYSICAL GAME SPACE VIA ONE OR MORE HOLOGRAPHIC IMAGES

RELATED APPLICATIONS

This application claims priority of U.S. Provisional Patent Application Ser. No. 61/284,134, filed Dec. 14, 2009.

FIELD OF THE INVENTION

The invention pertains to video gaming and, more specifically, to a feature enabling visual and audio representation of a player's mannerisms and voice in online game play.

BACKGROUND OF THE INVENTION

Throughout the short history of video-based gaming, there has been a constant quest for realism and interactivity. This is evidenced by the rapid transition from devices such as "Pong" through the Atari 2600 system to more advanced systems such as the Nintendo Wii system. The characters, actions, scenery, and appearances are designed to be as close to reality as possible. For example, video arcades now host games that vibrate, shake, and emit sounds during game play, in an attempt to fully engage the player in the game.

Despite the swift advances that have been made in video game realism and interactivity, no current game permits vocal interactivity in which a player can speak into a microphone and have an on-screen avatar appear as if it were speaking the player's words or sounds. Additionally, no existing video game permits a player to be projected in three dimensions within the virtual world, thus adding to the convincing nature of his speech.

A number of prior inventions provide for in-game voice communication serving to make the game experience more realistic, with various designs serving to react to voice amplitude or intonation. As will be shown, the invention herein achieves realism in a more comprehensive manner, and provides features not found in any of the prior inventions.

U.S. Pat. No. 7,491,123 by Smith for VIDEO GAME VOICE CHAT WITH AMPLITUDE-BASED VIRTUAL RANGING discloses a video game voice chat mechanism wherein the amplitude of a player's voice determines how far his message is carried in the game. The range the message carries is based on the amplitude of the speaker's voice and the relative positions of the speaker's avatar from the avatars of other players in the game environment.

U.S. Pat. No. 7,785,197 by Smith for VOICE-TO-TEXT CHAT CONVERSION FOR REMOTE VIDEO GAME PLAY discloses a multi-player networked video game playing system including for example video game consoles analyzes speech to vary the font size and/or color of associated text displayed to other users. If the amplitude of the voice is high, the text displayed to other users is displayed in a larger than normal font. If the voice sounds stressed or is aggressive words are used, the text displayed to other users is displayed using a special font such as red color. Other analysis may be performed on the speech in context to vary the font size, color, font type and/or other display attributes.

U.S. Pat. No. 7,512,656 by Tsuchiya for VOICE CHAT SYSTEM discloses a voice chat system suitable for networked games. The voice chat system comprises a plurality of game apparatuses connected to a communications network and a server apparatus that manages voice chat between the game apparatuses. The server apparatus obtains from a game apparatus the IP address of the game apparatus which is to be the partner for the voice chat. The voice information inputted into the game apparatus is relayed over the IP network as a VoIP packet and is delivered to the chat partner's game apparatus via the server apparatus. Through this configuration, chat sounds are not outputted to all game apparatuses connected to the network but, instead, are outputted only to the game apparatuses specified by a player.

SUMMARY OF THE INVENTION

The present invention is a vocally interactive video gaming mechanism. A microphone is connected to a video game system for allowing a player in a room to communicate by voice within the game. A video recording device is also provided for scanning and recording the physical characteristics of the player to be projected into the gaming world. A holographic projector projects the recorded physical characteristics of the player into the room in which the player is engaged in the game. Messages can be received from a telephone, a cell phone, a personal digital assistant, or a digital processor. Game progress can be halted in order for the player to answer or respond or to ignore the message. Movements of the player are tracked and converted into movements of the holographic projection of the player in real time. Voice recognition software enables translation of speech from one language into another language.

The present invention provides vocal and visual interactivity within the video game environment. The vocally interactive video game mechanism involves the use of a microphone and a video capture device (digital camera, cell phone, etc.). A player may speak into a microphone and have his comments, statements, or taunts seem to be coming from the mouth of his in-game avatar, appearing as if the avatar itself were speaking. Additionally, a user can pre-record comments, statements, taunts, etc. to be replayed at the touch of a button at the discretion of the player.

The avatar is a nearly identical representation of the player himself, created using the above mentioned video capture device. The player is scanned and projected in the virtual world, enabling the avatar to mimic the movements, actions, and mannerisms of the player. A 3-dimensional hologram of the player scan can also be projected within the room in which the player is engaged in the game.

In its ideal embodiment, the vocally interactive gaming mechanism can be used in conjunction with major video gaming devices such as the Xbox, Playstation 3, and Nintendo Wii. These gaming systems all have extensive worldwide online gaming communities. It is for that reason that the vocally interactive gaming mechanism also contains voice recognition and language translation software that instantaneously translates the player's speech into the language or languages necessary for the other player or players involved in the communication, allowing players from distinct parts of the world to interact seamlessly in the gaming environment.

In alternate embodiments, the vocally interactive gaming mechanism can be used with cell phones, personal digital assistants (PDAs), desktop computers, laptop computers, or hand held gaming devices.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

For a better understanding of the present invention, together with other and further objects, advantages and capabilities thereof, reference is made to the following disclosure and appended claims in connection with the above-described drawings. It is understood that like numerals will be used to indicate like elements from drawing figure to drawing figure.

In accordance with the present invention there is provided a vocally interactive video gaming mechanism. A microphone is connected to a video game system for allowing a player in a room to communicate by voice within the game. A video recording device is also provided for scanning and recording the physical characteristics of the player to be projected into the gaming world. A holographic projector projects the recorded physical characteristics of the player into the room in which the player is engaged in the game.

The system uses optional controllers with handheld devices, sensors and cameras to track the player's entire body. Separately available controllers may utilize accelerometers and/or gyroscopes for better precision and to detect motion. Infrared emitters and image sensors create detailed images that may be stored with computer programs, transmitted to various electronic devices for player action/viewing, and projected into detailed 3-D images via infrared projectors disposed in front of the player. The projectors can be adjusted for color, contrast, and/or size. The cameras can detect X-Y-Z positions while the emitters can provide X-Y positions.

Figure 1:
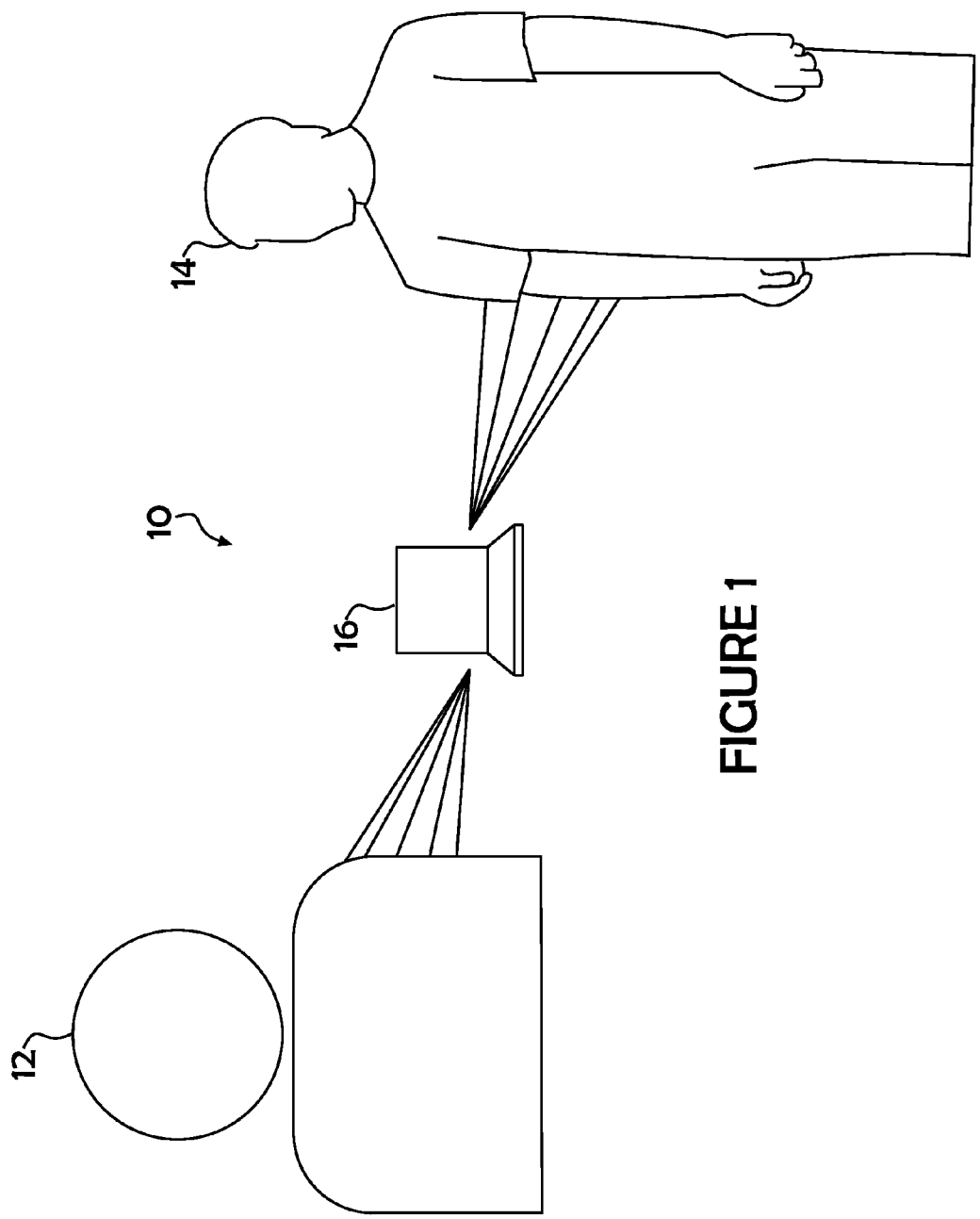
FIG. 1 is an image of an avatar and a living person being scanned by the hardware of the present invention.

Referring now to FIG. 1, there is shown an image of an avatar and a living person being scanned by the hardware of the present invention, generally identified as reference numeral 10. The avatar 12 is selected by a player 14 and is the subject of a projection into the room, not shown, in which the player 14 resides. The actual player 14 is scanned by an appropriate camera residing in or connected to a processor 16. Processor 16 includes a video camera, microphone, speaker, and scanner/projector, some or all of which may be disposed within processor 16 or electronically operatively connected thereto by hardwire or wirelessly. Processor 16 may also reside in a handheld device, as described hereinbelow.

The camera is a video camera, as is known in the art, capable of capturing moving images, so that movements of player 14 are projected in three dimensions in real time. Alongside this projected image is an image of avatar 12. Player 14 can adjust color, contrast, and size of the 3-D projection. In this way, the movements of avatar 12 mirror the movements of player 14. Multiple players can use the system of the invention 10 to control the movements of respective avatars. Moreover, multiple players can play each other via their respective avatars via the Internet. A language translator residing in processor 16 can also be used to translate languages of the various players, if necessary.

Figure 2:
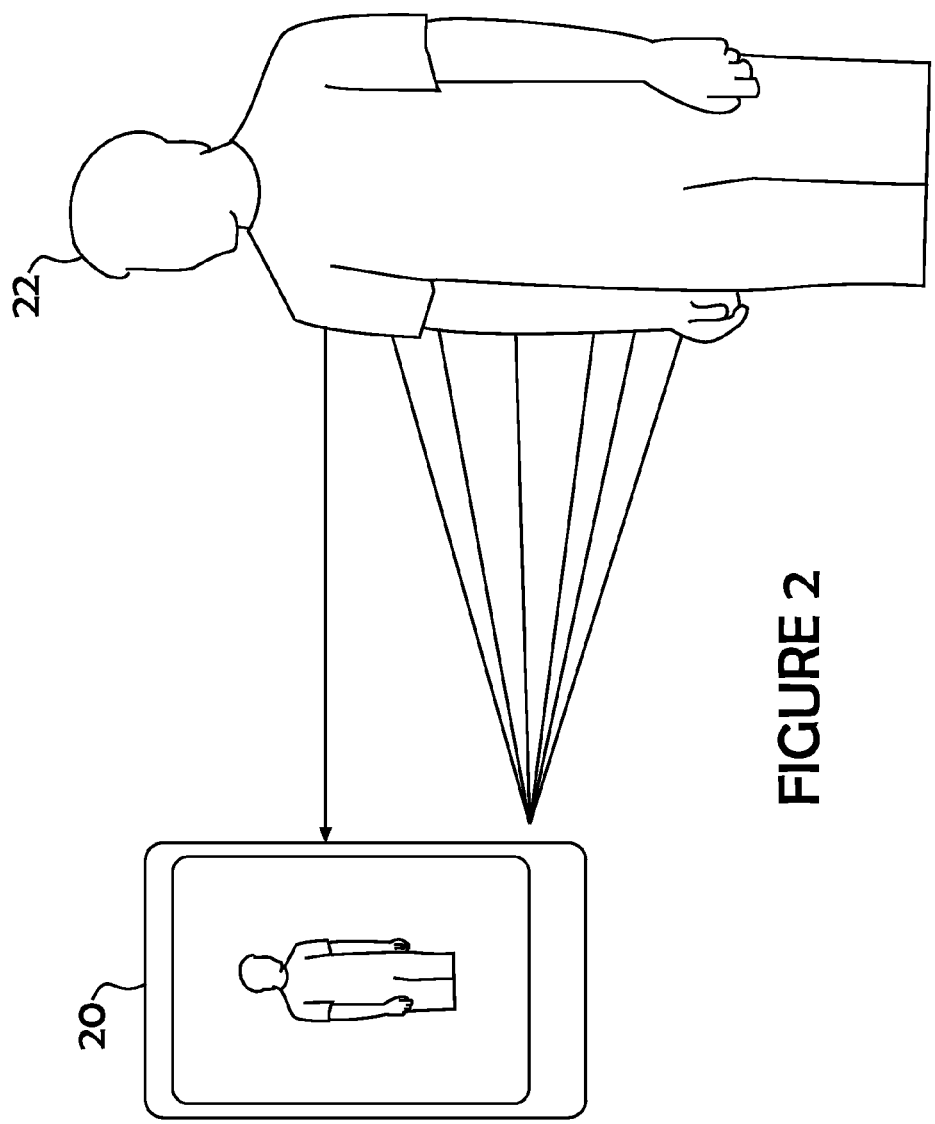
FIG. 2 is a handheld implementation of the present invention.

Referring now to FIG. 2, there is shown a handheld implementation of the present invention. A handheld device 20, such as a cell phone, can be used to interact with the images of one or more players 22. The computer-generated character can be another living person scanned into the game and playing over the Internet, a wireless communications telephone network, or, as shown, can reside in the same room as the handheld device 20. Handheld device 20 has pre-recording abilities, as well as freeze/pause action and save/store functions. Again, single and/or multi-player support and language translation, all in real time, can be provided. Living person 22 is scanned or has been scanned. His or her image is transmitted into handheld device 20 to play in the video game. The image has already been fully scanned and software allow the living player 22 to control his actions on the screen-scanned image via the keypad of handheld device 20. Moreover, living player 22 can speak into a microphone operatively connected to processor 16 (FIG. 1), so that the words and sound appear to emanate from device 20 with mouth, facial, and body movements that coincide with the image of avatar 12 (FIG. 1) displayed on device 20.

Figure 3:
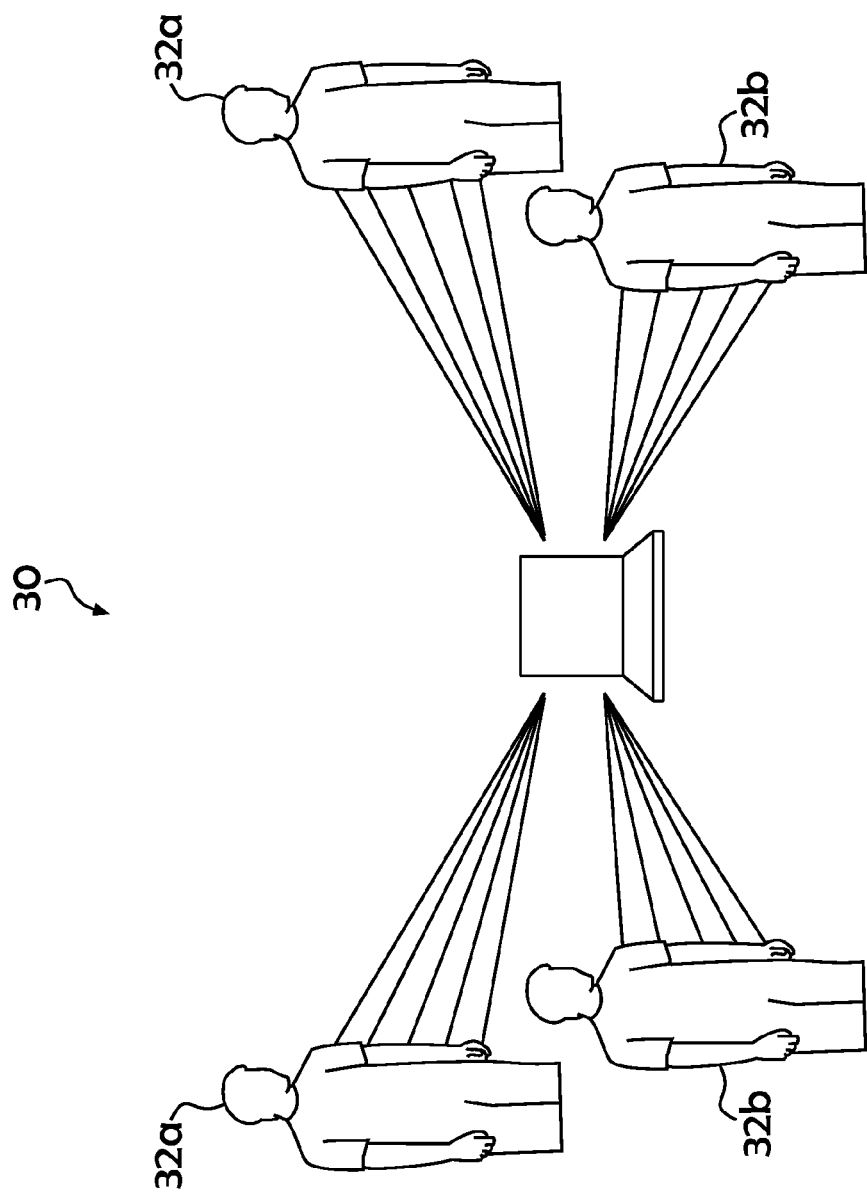
FIG. 3 is a depiction of the inventive system used with a plurality of live players and their respective avatar images.

Referring now to FIG. 3, there is shown the inventive system 30 used with a plurality of live players 32a, 32b, ..., 32n and their respective avatar images 34a, 34b, ..., 34n. The plurality of players can play with or against each other via the Internet or with the use of a telecommunications network, as required by devices such as cell phones, not shown. Each player can interact with other players from their respective homes or from one common location. Moreover, each player can represent himself or herself as a 3-D projection or as his or her avatar character.

Since other modifications and changes varied to fit particular operating requirements and environments will be apparent to those skilled in the art, the invention is not considered limited to the example chosen for purposes of this disclosure, and covers all changes and modifications which do not constitute departures from the true spirit and scope of this invention.

Having thus described the invention, what is desired to be protected by Letters Patent is presented in the subsequently appended claims.

What is claimed is:

1. A vocally interactive video gaming mechanism comprising:
   a) a microphone configured to connect to a video game system to allow a player in a physical game space to communicate by voice of said player within a video game by means of voice recognition software;
   b) a video recording device configured to scan the physical game space and record physical characteristics of said player, the physical characteristics including tracked movements of said player within said physical game space, wherein the recorded physical characteristics of said player in said physical game space are synchronously displayed, via a display device, with said voice of said player in a virtual gaming world of said video game in association with a virtual avatar;
   c) a holographic projection device configured to holographically project one or more holographic images corresponding to said player into said physical game space in which said player is engaged in said video game, wherein the one or more holographic images mimic the recorded physical characteristics and said voice of said player in real-time; and
   d) an audio speaker configured to generate sounds to accompany said one or more holographic images and said virtual avatar.

2. The vocally interactive video gaming mechanism as recited in claim 1, further comprising:
   e) a first mechanism configured to receive a message from at least one of the group comprising: a telephone, a cell phone, a personal digital assistance, and a digital processor.

3. The vocally interactive video gaming mechanism as recited in claim 2, further comprising:
   f) a second mechanism configured to pause a current game progress of said video game in order to allow said player to answer or respond to said message.

4. The vocally interactive video gaming mechanism as recited in claim 3, further comprising:
   g) a third mechanism configured to allow said player to ignore said message.

5. The vocally interactive video gaming mechanism as recited in claim 1, wherein said voice recognition software is further configured to translate said voice of said player from one language into another language.

\* \* \* \* \*